April 2, 1968  M. C. LOGAN ET AL  3,376,170
THERMOCOUPLE JUNCTIONS
Filed Feb. 27, 1964
Fig.2.
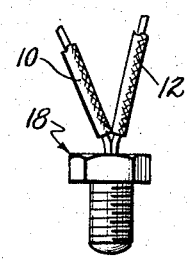
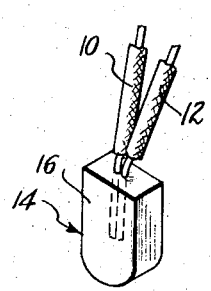
Fig.1.
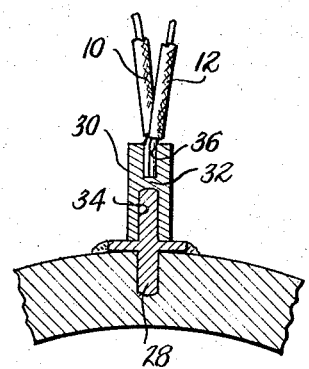
Fig.3.
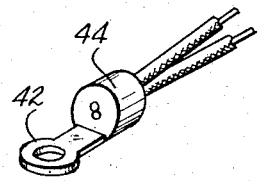
Fig.4.
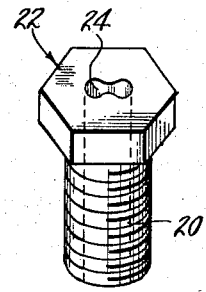
Fig.5.
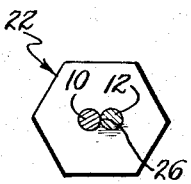
Fig.6.
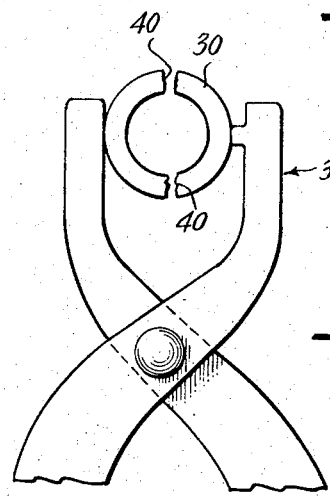
Fig.7.
INVENTOR
M.C. LOGAN & H.B. GIBSON
BY
ATTORNEY

United States Patent Office 3,376,170
Patented Apr. 2, 1968

3,376,170
THERMOCOUPLE JUNCTIONS
Maurus C. Logan, Elizabeth, and Howard B. Gibson, Glen Ridge, N.J., assignors to The Thomas & Betts Co., Elizabeth, N.J., a corporation of New Jersey
Filed Feb. 27, 1964, Ser. No. 347,720
12 Claims. (Cl. 136—233)

ABSTRACT OF THE DISCLOSURE

A thermocouple junction having a pair of metal wires of dissimilar metal in intimate contact with each other in a preformed sintered powdered metal sleeve. The metal sleeve contains the metals of the wires in approximately the same ratios and is circumferentially compressed completely about the wires to fill any space therebetween. The joint between the sleeve and wires is free of any solder or similar bonding metal so as to provide a uniform E.M.F.-temperature characteristic of the junction.

---

This invention relates to thermocouple junctions.

In the prior art thermocouple junctions have been made in various ways, for example; by tightly twisting together the free ends of dissimilar metals, with or without soldering or brazing of the joint, electrically welding adjoining ends of the dissimilar metals with or without brazing material, the ambient atmosphere being either air or a reducing agent or within a layer of air excluding oil, by silver soldering the ends of the metals, or by the use of an oxyacetylene torch with or without a flux and an additional metal. In all of these instances it has been found that unless great care be taken in the manufacture of the junction, there is no uniformity in the E.M.F.-temperature characteristic of the junction and, as a result, measurements made by the thermocouple with a selected mode of manufacture are not consistent. Thus it may be concluded that the desired characteristics of a thermocouple are dependent not only on the materials utilized at the junction, but on the care employed in the manufacture of the junction.

It is an object of this invention to provide a facile mode of manufacture of a thermocouple junction and which shall insure uniformity of the product.

It is a further object of the invention to provide a material for use with dissimilar metals forming the junction which shall result in a product having uniform constant characteristics.

A still further object of the invention is to provide a thermocouple junction with a coating material to inhibit deterioration of the junction due to oxidation or scaling.

These and other objects will become apparent after a consideration of the following specification in conjunction with the accompanying drawing in which:

FIG. 1 discloses a form of junction made in accordance with the invention.

FIG. 2 discloses a modified form of junction adapted to be screwed into the wall of a furnace or other instrumentality of which the temperature is to be measured.

FIG. 3 discloses still another form of junction showing another mode of attaching the junction to the instrumentality whose temperature is to be measured.

FIG. 4 discloses yet another form of junction and attaching means.

FIG. 5 is a perspective view of the powdered metal sleeve of FIG. 2 and utilized as the medium for binding together the two dissimilar metal conductors of the thermocouple.

FIG. 6 is an end view of a thermocouple junction utilizing the sleeve of FIG. 5, the conductor being shown in section.

FIG. 7 diagrammatically represents the fracturing of a connector.

Referring to the drawings in greater detail, at 10 and 12 in FIG. 1 there is indicated the two dissimilar metals leading to a measuring instrument, here shown in the form of wires, though obviously metal straps may be used, whose ends are secured together by a sleeve connector 14 of sintered powdered metal, preformed to suitable shape. After thus shaping the sleeve, it is slipped over the bare ends of the adjoining thermocouple wires and tightly compressed thereabout. Preferably, in order to avoid spurious electromotive forces being created at the junction, the metals of the connector partake of the characteristics of the two dissimilar metals of the wires or metal alloys of the wires. Thus, as an example, a common form of thermocouple employs a wire of iron and another of "constantan," the latter being a wire comprised of 55% copper and 45% nickel. In such a case, the connector would be made of powdered metals, sintered together, the metals being those existing in the wires, namely: iron, copper and nickel. The proportions of metal ingredients used are not critical so long as the metals of the wires are represented in a substantial proportion. In the case of iron and "constantan" as the thermocouple wires, a homogeneous mixture of 50% iron, 22½% nickel and the balance copper would closely approximate the percentage constituents of the wire metals and would be utilized as the materials of the sleeve. If high temperatures are to be measured, the noble metals may be added to, or substituted for, one of the metals utilized in "constantan."

In the process of manufacture of any of the connectors of this invention, the connectors are initially molded of the desired metal powders into a green compacted form by the application of considerable pressure applied exteriorly all about the powdered mass. Then the green compact is sintered. For an amplification of this method see the application Ser. No. 347,829, now U.S. Patent No. 3,345,452, of applicants, Maurus C. Logan and Howard B. Gibson, for Sintered Powdered Metal Connectors filed of even date herewith.

In order to prevent oxidation or scaling of the connector, it may be coated with a thin film of aluminum which can be oxidized to form a refractory protective alumina coating, indicated at 16. Obviously other difficultly oxidizable metals, as gold and the rare metals, may be employed, and resins may also be utilized as set forth in the copending application.

In a second form of connector, illustrated in FIG. 2, the connector, indicated as 18, is of sintered powdered material originally molded and sintered to form. The applied connector of FIG. 5 is a sleeve which has an exteriorly molded threaded surface 20, and a non-circularly molded nut head 22, as a hexagon, adapted to be engaged by a similarly configurated and tightly fitted wrench, for sleeve rotation. It also has an axial opening 24 extending through the length of the sleeve of a size to easily accommodate the bared wires of the thermocouple. After the initially sintered sleeve shown in FIG. 5 has been slipped over the bared wires, an appropriately shaped tool having faces which have the configuration of the threaded portion and nut formation of the finished sleeve of FIG. 2 is applied to the sleeve so as to compress the materials of the sleeve radially inward toward the wires to tightly bind the wires within the sleeve. Since the tool may be a simple device, as two opposed jaws having semicircular faces to engage the threads and opposed half hexagons of the nut portion of the sleeve, and since a constant final pressure may be applied to the tool, the application of the connector to the wires is simple and results in a uniform product.

After the connector and wires have been assembled, there is no space between the wires and the connector, see FIG. 6, and the wires themselves have been tightly squeezed together for good electrical contact, as indicated at 26.

It will also be noted that no fluxing or solder or similar materials are utilized in this or any of the joints of the invention. The form of joint shown in FIGS. 2, 5 and 6 is particularly suitable for use in oven walls or the like having threaded openings to receive the thermocouple junction.

The form of invention shown in FIG. 3 is particularly adapted to devices having pins, as pins 28, welded or otherwise permanently secured to equipment. As shown in FIG. 3, the connector is a hollow sleeve of sintered powdered metal 30 which may be provided with a partition wall 32. The interior diameter of the lower portion 34 of the sleeve is of a size to snugly accommodate the pin 28 while the interior diameter of the upper portion 36 of the sleeve similarly snugly accommodates the bared thermocouple wires 10 and 12. The connector shown in FIG. 3 is particularly useful in conjunction with experimental pin boards since the connectors are easily fracturable by the application of tensile forces applied to the connectors. While inwardly directed radially compressive forces applied to the connector from substantially all directions will compact the sintered material, a pair of directly opposed inwardly directed forces without compression at other areas on the sleeve, will cause the sleeve to fracture. Thus, see FIG. 7, a pair of pliers 38 with flat faces, or with a pin on a face, squeezed against the sleeve 30 will easily fracture the same in areas removed 90° from where the force is applied, as at 40, and will effect quick detachment of the thermocouple from the pin. In FIG. 4 there is shown a form of junction wherein the connecting portion thereof is in the form of a lug 42 which may be perforated for attachment or provided with a conventional bifurcated spade end. The lug may be of any desired metal, as copper. The junction at the sleeve portion 44 is of powdered metal as hereinbefore described for the other junctions.

While only the connector of FIG. 1 has been specifically described as covered with a protective coating, it is obvious that any of the connectors of the invention may be so coated.

It is to be understood that the forms of invention herein disclosed are exemplary only and that it is intended the claims shall cover all equivalents which fall within the language of the claims.

Having thus described the invention, what is claimed is:

1. A thermocouple junction comprised of two wires of dissimilar metal and a connector for the wires including a sintered powdered metal sleeve tightly deformed under circumferentially applied compression forces about the wires into intimate contact with said wires, said sleeve being exteriorly threaded and provided with a non-circular head.

2. A thermocouple junction comprised of two wires of dissimilar metal and a connector for the wires, said connector being a sleeve of sintered powdered metal, one end of which is deformed tightly about the wires under a circumferentially applied compression force and the other end of which has an opening for receiving a pin or a tang to be grasped by compressing the other end of the sleeve about the pin under a circumferentially applied compression force.

3. A thermocouple junction as claimed in claim 2 wherein the sleeve is provided with an axial opening extending inwardly from one end portion thereof and a transverse partition divides the axial opening into two portions.

4. A thermocouple junction comprised of two wires of dissimilar metal and a connector intimately binding the wires against each other, said connector being a preformed sleeve of sintered powdered metal formed of metal powders including the metal of each of said wires and having an axial opening therethrough whose outline conforms to the exterior boundary of the wires and is adapted to closely encompass the wires, said connector being adapted, by inward radial forces applied to substantially the entire exterior of the sleeve, to be tightly deformed about the wires.

5. A thermocouple junction comprising a pair of wires, at least a portion of each of said wires being of a dissimilar metal from the other of said wires, and a preformed sintered powdered metal sleeve deformed about said wires by circumferentially applied compression forces to completely surround and contact said wires and to intimately bind said wires together in intimate contact with each other to form an electrical contact.

6. A thermocouple junction as defined in claim 5 wherein said sleeve is formed from metal powders corresponding to those of the metals of said wires.

7. A thermocouple as defined in claim 6 in which the percentage of each of the different powdered metals in the sleeve is substantially the same as the percentage of each of the different metals of the combined metals in the wires of the thermocouple.

8. A thermocouple as defined in claim 6 in which the wires are respectively of substantially pure iron and of an alloy, said alloy being of copper and nickel, said copper constituting substantially 55% of the alloy, and the nickel constituting substantially 45% of the alloy, the sleeve being a sintered powdered mixture consisting of substantially 50% iron, 27½% copper and 22½% nickel.

9. A thermocouple junction as set forth in claim 5 wherein said sleeve of sintered powdered metal particles has a property of tensile strength enabling said sleeve to be fractured under a pair of directly opposed inwardly directed forces without compression at other areas of said sleeve.

10. A junction as defined in claim 5 wherein the sleeve is provided with an attaching lug.

11. A thermocouple junction as defined in claim 5 in which the connector is coated with a protective coating.

12. A thermocouple junction as defined in claim 11 in which the coating is alumina.

References Cited

UNITED STATES PATENTS

| | | | |
|---|---|---|---|
| 1,660,504 | 2/1928 | Grubb | 136—233 |
| 1,708,193 | 4/1929 | Sherwood | 339—275 |
| 2,317,168 | 4/1943 | Ball | 136—229 |
| 2,330,018 | 9/1943 | Van Wert | 136—233 X |
| 2,427,518 | 9/1947 | Bergan | 339—275 |
| 3,072,733 | 1/1963 | Sasaki et al. | 136—201 |
| 3,193,792 | 7/1965 | Shea | 339—276 |

OTHER REFERENCES

R. Royds: The Measurement of Temperature, pages 115, 116 (1921).

ALLEN B. CURTIS, *Primary Examiner.*